United States Patent [19]

Briechle et al.

[11] 4,137,533
[45] Jan. 30, 1979

[54] ANGLE/VECTOR PROCESSED, PHASE-ACCUMULATED SINGLE VECTOR ROTATION, VARIABLE ORDER ADAPTIVE MTI PROCESSOR

[75] Inventors: George T. Briechle, Monroe; John A. Di Domizio, Norwalk; Frederik Weindling, Westport, all of Conn.

[73] Assignee: United Technologies Corporation, Hartford, Conn.

[21] Appl. No.: 841,279

[22] Filed: Oct. 12, 1977

[51] Int. Cl.² ............................................. G01S 9/42
[52] U.S. Cl. ..................................................... 343/7.7
[58] Field of Search ......................................... 343/7.7

[56] References Cited

U.S. PATENT DOCUMENTS

| 3,877,011 | 4/1975 | Holberg et al. | 343/7.7 |
|---|---|---|---|
| 3,882,498 | 5/1975 | McGuffin | 343/7.7 X |
| 3,962,704 | 6/1976 | Evans | 343/7.7 |
| 3,972,041 | 7/1976 | Howard | 343/7.7 |
| 3,987,442 | 10/1976 | McLeod, Jr. | 343/7.7 |
| 4,058,809 | 11/1977 | Chudleigh, Jr. | 343/7.7 X |
| 4,062,011 | 12/1977 | Preston et al. | 343/7.7 X |

*Primary Examiner*—T.H. Tubbesing
*Attorney, Agent, or Firm*—M. P. Williams

[57] ABSTRACT

In-phase (I) and quadrature (Q) radar return signals are converted to phase to provide phase difference between like range bins of successive pulse repetition intervals (PRI's), the phase differences being reconverted to I and Q format for accumulation across multi-range-bin windows surrounding each range bin to be processed, the normalized range bin accumulations being continuously accumulated in the angle domain, in successive PRI's, to provide clutter phase angle estimates used to rotate incoming target video vectors, a single time, back to the estimated zero-doppler phase of the first PRI of a multi-PRI batch for clutter-elimination filtering. Third-order and fourth-order filtering (utilizing four-PRI and five-PRI batches, respectively), is achieved on a constant one-out-of-four PRI output basis by utilizing the same weighted data for the highest PRI of one fourth-order batch and the lowest PRI of the next higher fourth-order batch, which is rendered possible by the continuous accumulation of estimated phases, over successive PRI's.

8 Claims, 8 Drawing Figures

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| (a) | PRI (18) | 1 | 2 | 3 | 4 | 5 | 6 | 7 | 8 | 9 | 10 | 11 | 12 | 13 |
| (b) | BINARY (244) | 00 | 01 | 10 | 11 | 00 | 01 | 10 | 11 | 00 | 01 | 10 | 11 | 00 |
| (c) | CLEAR WEIGHT | $+\frac{1}{4}$ | $-1$ | $+1$ | $-\frac{1}{4}$ | $+\frac{1}{4}$ | $-1$ | $+1$ | $-\frac{1}{4}$ | $+\frac{1}{4}$ | $-1$ | $+1$ | $-\frac{1}{4}$ | $+\frac{1}{4}$ |
| (e) | RAIN WEIGHT | $+\frac{1}{4}$ | $-\frac{3}{4}$ | $+1$ | $-\frac{3}{4}$ | $+\frac{1}{4}$ | $-\frac{3}{4}$ | $+1$ | $-\frac{3}{4}$ | $+\frac{1}{4}$ | $-\frac{3}{4}$ | $+1$ | $-\frac{3}{4}$ | $+\frac{1}{4}$ |

ANGLE/VECTOR PROCESSED, PHASE-ACCUMULATED SINGLE VECTOR ROTATION, VARIABLE ORDER ADAPTIVE MTI PROCESSOR

The invention disclosed herein was made in the course of or under a contract with the Department of the Navy.

CROSS REFERENCE TO RELATED APPLICATIONS

The adaptive MTI system disclosed herein may incorporate the adaptive MTI TARGET/CLUTTER DISCRIMINATOR disclosed in a commonly owned, copending application of DiDomizio, Briechle and Ell, Ser. No. 841,504, filed on even date herewith.

BACKGROUND OF THE INVENTION

This invention relates to adaptive moving target indicator radar systems, and more particularly to improvements in clutter locking techniques involving estimated phase difference accumulation and multi-order clutter cancellation filtering therein.

DESCRIPTION OF THE PRIOR ART

A known form of radar is the adaptive moving target indicator adaptive MTI radar. In general, this type of radar attempts to operate on a simulated coherent-on-receive basis, even though the radar receiver is operated in a non-coherent fashion (without the local oscillator being locked to exactly the same frequency and phase as the transmitted pulse). Moving targets are indicated by sensing those return signals having a doppler frequency which is significantly different than the average clutter frequency in the return signals. An adaptive MTI of proper design will not only take into account classical clutter, such as from rain or ground-target returns, but will also accommodate motion of the radar (as on a plane or a ship) and even instabilities in the instantaneous phase of the radar transmitter itself.

One early form of adaptive MTI radar is illustrated in Howard U.S. Pat. No. 3,972,041, in which only phase angles are processed. An average clutter phase difference between successive PRIs is accumulated for each range bin, and compared with the current phase difference between the last PRI and the current PRI for a given range bin; if these phase differences differ by a threshold amount, a target is indicated. This type of adaptive MTI does not use amplitude of target or clutter in the processing. A principal problem is that if the clutter amplitude is large compared to an actual target amplitude within a range bin being processed, then the determined phase difference will be dominated by the clutter rather than the target, and, therefore, the phase difference for the range bin being processed may be very near the estimated clutter phase, determined by averaging phase differences in range bins surrounding the range bin being processed, so that the phase difference will be below the threshold magnitude and the target will go undetected. The second problems with angle processing of any sort is that there is discontinuity in angle-representing data at ±pi, at zero and two pi, or wherever the linear scale is interrupted. This prevents simple addition of angles without gross errors, unless quadrant detection and pre-summation angle correction (of same form) are used. In an adaptive MTI simple angle summation results in very large phase difference errors, thereby upsetting the clutter phase estimation to the point where many more targets will be invisible, and the improvement factor is significantly reduced.

A more sophisticated adpative MTI is disclosed in McLeod, Jr. U.S. Pat. No. 3,987,442. In that patent, the processing is all performed in the vector domain, using sine and cosine (Q and I). This includes the amplitude information, thereby avoiding problems of angle processors and, being in the vector format, avoids ambiguities at any angle since the rectangular components of vectors will add to an unambiguous angle, regardless of slight errors therein. However, the processing in the McLeod, Jr. patent includes finding the PRI-to-PRI phase difference for each range bin in rectangular coordinates, which necessitates utilization of complex multiplication to perform the vector rotation indicative of the phase difference from one PRI to the next. This also requires two full PRI's of storage (e.g., on the order of 2000 range bins), one for the in-phase component and one for the quadrature component, rather than a single set of storage for a number representative of the phase angle. In the McLeod, Jr. disclosure, even the phase angle difference is performed with clutter and/or target magnitudes therein, which results in dynamic range problems (e.g., full scale of digital circuits) and complex multiplication. Errors which, although possibly tolerable in the McLeod, Jr. patent since they represent only small targets such as aircraft (which will, in general, have magnitudes less than the clutter) can become extremely large in the case of large targets such as ships (which will, in general, have magnitudes less than the clutter) thereby causing a great deal of error in the estimated average clutter phase difference. Complex multiplication, with a practical word size, necessarily introduces errors separately in the I and Q channels, causing loss of orthogonality, giving rise to equivalent phase angle errors. A further problem in an adaptive MTI of the type disclosed in the McLeod, Jr. patent is that the batch filtering of rotated in-phase and quadrature video for several successive PRI's, with a separate average phase angle for each PRI, is performed by cumulative rotation of summed vectors, so that errors in one rotation are accumulated into the next; and, because amplitude weighting is provided prior to the complex-multiplication rotation, the successive summations cannot be normalized so as to avoid non-orthogonal error accumulations. Thus, the need for cumulative complex multiplications, for storage of both in-phase and quadrature averages over entire PRI's, and the accumulation of successive complex multiplications without normalization provide unde complexity and error.

Another feaure of a desirable adaptive MTI radar is its ability to alter the clutter-cancellation filtering which is utilized, particularly to provide different modes of clutter-cancellation in rain and clear weather environments. However, the provision of filters of different orders may become difficult, particularly where a desired output rate (e.g., one output for every four PRIs) is desired, which may be the case whenever the MTI output is to be interleaved with other outputs required on a constant periodic basis.

SUMMARY OF THE INVENTION

Objects of the present invention include provision of adaptive MTI processing which is relatively simple, avoids angle domain summation errors, requires only a single complex multiplication of each input of the in-phase and quadrature video, avoids accumulation of phase error, and minimizes dynamic range problems.

According to the present invention, the phase difference between return signals received in consecutive PRI's is processed to provide an average estimated clutter phase in the vector format (I and Q) utilizing only normalized rectangular components. In further accord with the invention, the processing of phase differences for successive PRIs is accumulated over all of the PRIs in a batch so that rotation of the potentially target-bearing incoming video need be performed only once on each range bin of video, each being rotated to a common, estimated zero doppler phase of the first PRI in a several-PRI batch for that range bin, thereby avoiding accumulation of error from repetitive complex multiplications, while at the same time permitting clutter cancellation.

In accordance still further with the present invention, estimated phase accumulation need not be reset or reestablished on a batch by batch basis, thereby permitting utilization of a weighted input video of one batch in the next adjacent batch as well, so as to accommodate processing of batches of various orders, with a constant output rate regardless of order.

A feature of the present invention is its adaptability to utilization of clutter/target discrimination of a simple and effective type as disclosed in the aforementioned copending application. Another feature of the present invention is the elimination of cumulative complex multiplications, required in step-by-step phase rotation in adaptive MTI radars known to the prior art. Another feature of the invention is the ability to provide phase accumulation in the angle domain, thereby eliminating the need for dual sets of PRI-length storage devices, while at the same time processing phase estimations in the vector format to avoid ambiguity. The invention avoids dynamic range problems by processing information in the vector format which has been normalized, thereby eliminating amplitude from phase estimation, while at the same time utilizing the normalized phase information data to perform but a single rotation on each input vector in order to align the input vectors of a batch for multi-order, clutter-cancellation filtering.

The foregoing and other objects, features and advantages of the present invention will become more apparent in the light of the following detailed description of exemplary embodiments thereof, as illustrated in the accompanying drawing.

DETAILED DESCRIPTION

Figure 1:
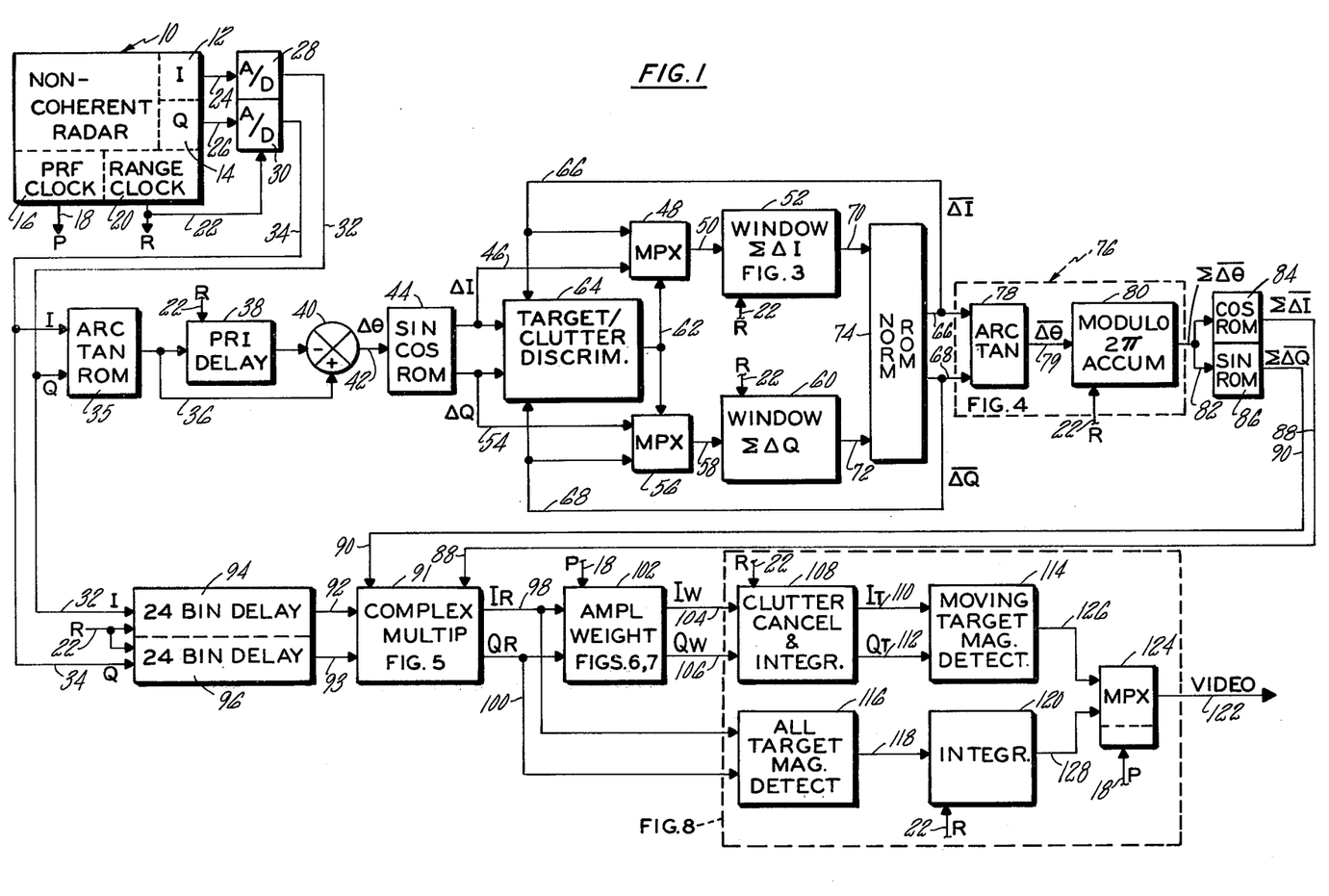
FIG. 1 is a simplified schematic block diagram of an adaptive MTI in accordance with the present invention.

Referring now to FIG. 1, the present invention is utilized in processing signals acquired by a radar 10 of the type known in the art, which processes its IF frequency information in two difference channels shifted in phase by 90° so as to provide signals indicative of radar returns at the intermediate frequency in an in-phase channel (I) 12 and in a quadrature channel (Q) 14, as well as to provide signals (P) for each transmission or "main bang" from a pulse repetition frequency (PRF) clock 16 on a line 18, and signals (R) delineating each of the range bins from a range clock 20 on a line 22. One of the advantages of the invention is that it provides moving target detection admidst clutter in radars which are non-coherent (that is, the IF is not generated with a signal coherent with the transmitted pulse); however, the invention may be used with coherent radar, if desired.

The I and Q IF signals are provided in analog fashion on lines 24 and 26 to respective analog to digital (A/D) converters 28, 30, the output of which on lines 32 and 34 are digital representations of the magnitudes of the in-phase and quadrature (respectively) components of the return wave as received by the radar, for each of a sequence of range bins (which may, in the example herein, include 2048 range bins) for each transmitted pulse (occurring once each pulse repetition interval, or PRI). The remainder of the disclosure herein is digital in nature and, for simplicity, FIG. 1 has been shown with individual signal lines, rather than trunks of lines to accommodate words of binary bits. In the embodiment described herein, it is presumed that the digital data is in two's complement form. As is known, positive numbers contain zero in the high order bit and negative numbers contain one in the high order bit and combination of ones and zeros in lower ordered bits to represent the binary value; in an eight-bit word; e.g., a maximum positive number is 01111111 and a maximum negative number is 10000000. And as is known, conversion from a positive number to a negative and vice versa is accomplished by simple complementing of each bit, followed by adding a one into the low order bit.

The I and Q signals are applied by lines 32 and 34 to a read-only memory (ROM) 35 which supplies on line 36 the arc tangent corresponding to the cosine (I) and sine (Q) inputs thereto. These are stored for one PRI in a 2048 bit shift register 38, the output of which is subtracted from the output of the ROM 34 in a subtractor 40. For any given range bin, the output of the subtractor 40 on lines 42 is the phase difference between the returns of the last two PRIs. This is referred to herein as $\Delta\theta$. The purpose of utilizing the ROM 35 to convert to phase angle prior to the one PRI delay and subtraction is simply to reduce the amount of hardware required and to reduce the accumulation of error, since providing the phase difference in the form of I and Q signals would require twice as much storage across 2048 range bins and a complex multiplication at this point, rather than a simple digital subtraction.

The signals representing $\Delta\theta$ for each range bin in each PRI are applied to a sine and cosine ROM 44 to reconvert the signals into the I/Q domain for further processing in accordance with the present invention. This eliminates error from angle ambiguity, since the sines and cosines of resultant $\Delta\theta$'s are unambiguous (e.g., $+35° - (+350°) = -225°$, having same sine/cosine as $+45°$, the desired result). The $\Delta I$ signals on the lines 46 are connected to a multiplexer 48, the output of which on lines 50 is applied to window circuitry 52 for summing the $\Delta I$ signals over the range bins in a window, which is defined with respect to FIG. 3 hereinafter. Similarly, the $\Delta Q$ signals on lines 54 are connected to a multiplexer 56, the output of which on lines 58 are applied to window circuitry 60 for generating the summation of $\Delta Q$ over the range bins in the aforementioned window. The multiplexer circuits 48, 56 may be operated by a signal on a line 62 generated by a target/clutter discriminator 64, of the type described in detail in the aforementioned copending application, in the event that comparison of the $\Delta I$ and $\Delta Q$ signals currently being processed with previously calculated average $\Delta I$ signals on lines 66 and/or average $\Delta Q$ signals on lines 68 indicate that the current varies widely from the average, and thus the probability of polluting the clutter phase estimate. This may be as a consequence of the current range bin including a target, or significant noise (compared to the clutter), or any other non-clutter-like signal. In such case, the previously calculated averages $\overline{\Delta I}, \overline{\Delta Q}$ on lines 66 and 68 are utilized instead of the current $\Delta I$ and $\Delta Q$ signals on the lines 46 and 54, to preserve the phase estimate. For the purposes of this invention, however, this feature need not be included if its benefits are not desired; instead the $\Delta I$ and $\Delta Q$ signals on lines 46, 54 may be applied directly to the window circuitry 52, 60, respectively. It is one of the features of the magnitude-free I and Q processing of the adaptive MTI disclosed in FIG. 1 that contamination by targets is reduced, even in the case of very large amplitude targets, because the signals on the lines 46 and 54 are normalized into fractions between zero and one as determined by the sine/cosine ROM 44. This is in contrast with the prior art wherein processing includes rotation of unnormalized I and Q inputs by complex multiplication, thereby including large target vector magnitude contamination, or is accomplished purely in the angle domain, which is ambiguous at plus and minus pi, as described hereinbefore.

Figure 4:
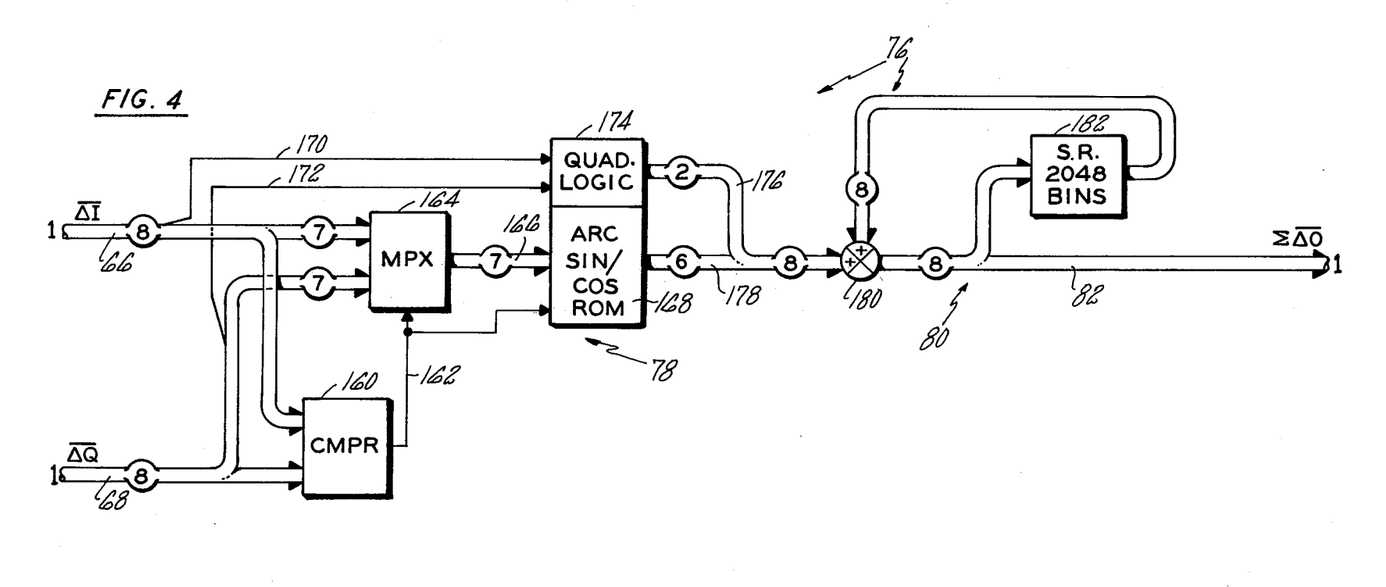
FIG. 4 is a simplified schematic block diagram of a phase angle accumulator for use in the embodiment of FIG. 1.

The $\Sigma\overline{\Delta I}$ and $\Sigma\overline{\Delta Q}$ outputs of the window circuitry 52, 60 on lines 70, 72 are normalized in a ROM 74 to provide normalized average $\Delta I$ signals ($\overline{\Delta I}$) on the lines 66 and normalized average $\Delta Q$ signals ($\overline{\Delta Q}$) on lines 68. These are applied to a phase accumulator circuit 76 which (as is described more fully with respect to FIG. 4, hereinafter) includes an arc tangent generator 78 to provide an average phase difference signal ($\overline{\Delta\theta}$) on lines 79 to a modulo two pi accumulator 80, the output of which on lines 82 constitutes a running summation, modulo two pi, of the average phase of signals received by the radar, $\Sigma\overline{\Delta\theta}$. This signal is reconverted into I/Q format by sine and cosine ROMs, the outputs of which $\Sigma\overline{\Delta I}$ and $\Sigma\overline{\Delta Q}$ on lines 88 and 90 are provided to vector rotation means such as complex multiplier circuitry 92, the details of which are described with respect to FIG. 5 hereinafter. The purpose of the complex multiplier circuitry 92 is, as known in the art, to rotate the incoming data in any given range bin during a given PRI by a given angle. In this invention, the angle is the running summation of average phase difference in succeeding PRIs for range bins surrounding the given range bin (due to the manner of operation of the window circuitry 52). This causes a four-PRI or five-PRI batch of return signals to be rotated back to the estimated clutter phase of the first PRI in the batch, whereby the batch can be passed through a third- or fourth-order clutter elimination filter in a manner which is described with respect to FIGS. 6-8 hereinafter. Thus, the $\Sigma\overline{\Delta I}$ and $\Sigma\overline{\Delta Q}$ signals on the lines 88, 90 represent the estimated phase through which each incoming signal must be rotated in order to achieve the desired clutter filtering, and the complex multiplier 91 provides the desired rotation.

In order to cause the data on lines 32 and 34 to align itself on a correct range bin basis with the corresponding $\Sigma\overline{\Delta I}$ and $\Sigma\overline{\Delta Q}$, the incoming data on lines 32 and 34 is delayed a requisite amount in related shift registers 94, 96. As is described more fully with respect to FIG. 2 hereinafter, there is an inherent ten range-bin delay required by the processing used herein, and, in the present embodiment, there is an additional fourteen range bins of equivalent circuit propagation time delay involved in the processing. Thus, in the embodiment disclosed herein, a twenty four range bin delay is required in the circuits 94, 96; this may vary in other embodiments, wherein the processing time, and/or the numbers of range bins across which averages are taken, may vary.

After the incoming data is rotated by a phase angle representing the summation of average phase differences (from successive PRIs) of clutter surrounding the target, to provide rotated information signals $I_R$ and $Q_R$ on lines 98, 100, the data is weighted in amplitude by circuitry 102 to provide weighted signals $I_W$ and $Q_W$ on lines 104, 106 for application to a clutter cancelling and integration circuit 108, the output of which comprises in-phase and quadrature components $I_T$, $Q_T$ on lines 110, 112, of substantially moving target information for detection in a magnitude detecting circuit 114. In order to detect all targets, whether moving or not, the rotated I and Q components of the data on lines 98 and 100 are provided to a magnitude detector 116, the output of which on lines 118 is integrated in an integrator 120. The video output of the apparatus is provided on lines 122 by a multiplier 124 in response either to moving targets provided on lines 126 by the moving target magnitude detector 114 or to all targets on lines 128 provided by the all-target integrator 120.

The general type of processing performed by the present invention is not new, to the extent that the determination of an average clutter phase and rotation of the data by that phase, followed by amplitude weighting and clutter cancellation has been known. One aspect of the present invention, however, is in the provision of a per-range bin estimated clutter phase in the I and Q domain without any amplitude contamination therein. As described hereinbefore, this is significant in cases where the targets (such as large ships) may have magnitudes in excess of clutter, and may even extend through several range bins. Another aspect of the invention is the shifting between the angle and I/Q domains; errors which can result by complex multiplication are eliminated herein by taking the original phase difference in the adder 40 in the angle domain; errors resulting from processing I and Q information including magnitude so as to provide estimated, average clutter phase summations are avoided by processing the data in the form of unit vectors provided by the normalizing effect of the sine/cosine ROM 44, the I/Q normalizing ROM 74, and the cosine and sine ROMs 84, 86, which maintain the data in the unit vector format and avoids amplitude contamination, accumulated errors, and the like.

Figure 2:
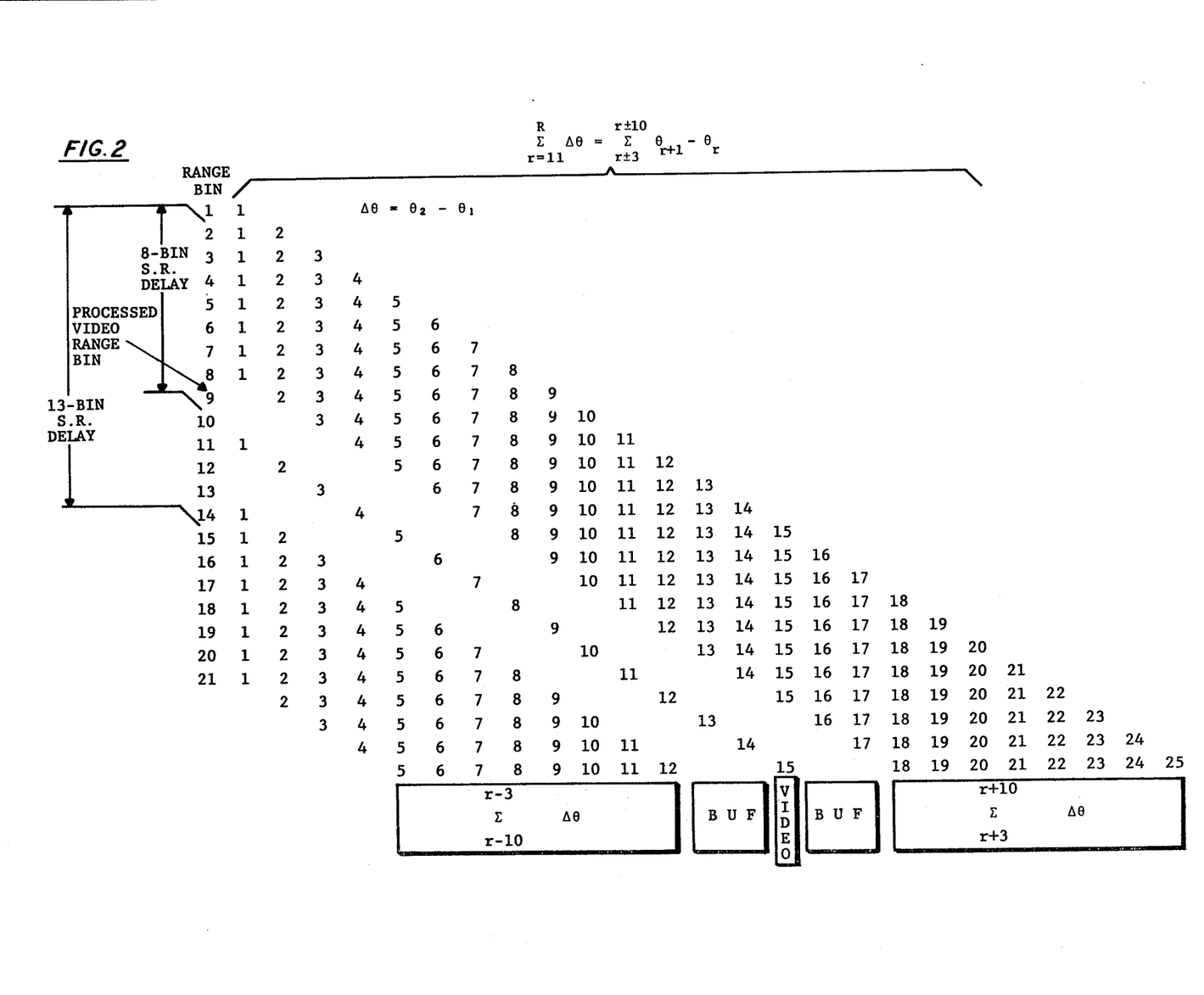
FIG. 2 is a chart illustrative of phase estimation signal processing in accordance with the present invention.
Figure 3:
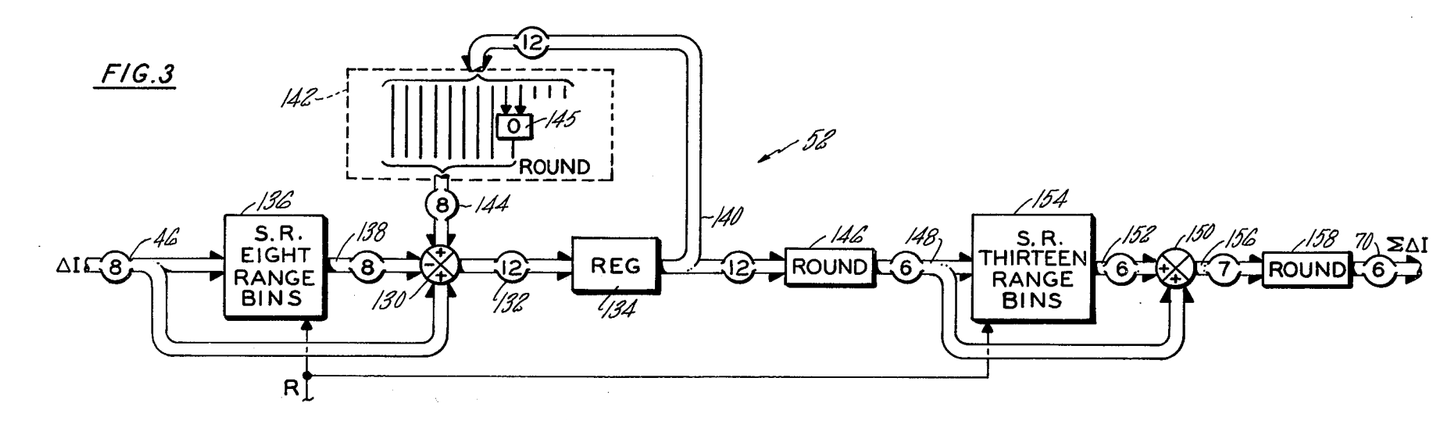
FIG. 3 is a simplified schematic block diagram of a window phase summation circuitry for use in the embodiment of FIG. 1.

Referring now to FIGS. 2 and 3, within the window summation circuit 52, the ΔI signals on the lines 46 are applied directly to an adder 130, the output of which on lines 132 are fed to a register 134 which, with the adder 130, constitutes an accumulator for eight range bins of ΔI signals on the lines 46. The ΔI signals on the lines 46 are also applied to a shift register 136, the output of which on lines 138 are provided to a negative input of (or otherwise caused to be subtracted in) the adder 130. The output of the register 134 on lines 140, after being reduced in number by a rounding circuit 142, is applied by lines 144 to a positive input to the adder 130. The rounding circuit 142 and other rounding circuits illustrated generally herein, utilize a well known statistical rounding principle which is to OR the lowest ordered bit being kept with the highest ordered bit being discarded, to create a new low order bit which statistically will be higher or lower by one bit on an average basis. This is achieved, as is illustrated in the circuitry 142 of FIG. 3, by simple means of an OR circuit 145. As illustrated in FIG. 3, rounding is utilized to avoid excessive buildup of the number of bits which need be processed in order to yield information to the desired accuracy. However, this need not be performed in any embodiment where it is found not to be advantageous.

As is illustrated in FIG. 3, the very first ΔI signal, which constitutes the in-phase component of the phase difference between the first range bin of the first PRI and the first range bin of the second PRI is available on the lines 46 during the second PRI. This is added in through the adder 130 to the register 134, and is available on the lines 144 during the second range bin, where the second ΔI is applied to the adder 130. This continues until eight range bins have been accumulated in the register 134. In the ninth range bin, the same signals begin to shift out of the shift register 136, so that the first ΔI appears on the lines 138 and is subtracted from the accumulated result in the register 134 as the ninth ΔI is being applied to the adder 130 on the lines 46. Thus the output of the register 134 on lines 140 consists of the summation of the last eight range bins of in-phase component of phase difference between each range bin of one PRI and the same range bin of the preceding PRI (except during the first eight range bins, when the process is started up). But, as is described hereinafter, the start up time is no problem since the accumulated data is normalized in any event, so that the phase information in the first eight range bins will be indicative of the averaging which has been possible up to that point.

The eight-range-bin summation of the ΔI's on lines 140 is passed through a rounding circuit 146, so as to be reduced from twelve bits to six bits in number, and is applied on lines 148, to an adder 150 along with the output on lines 152 from a shift register 154. The shift register 154 provides thirteen range bins of delay so that there is a summation window comprising two eight-range bin averages separated by a five bin gap, the central bin of the window being the video bin to be processed for target information. A five bin gap is desirable in order to prevent moving targets of long extent in range, such as ships, from corrupting a clutter estimate as they slide through the window. Thus, as seen in FIG. 2, after eight range bins, the first eight-bin average of ΔI is available on the lines 148; thirteen range bins later (range bin 21), this eight-bin average will begin to be available at the adder 150 along with a different eight-bin average (consisting of range bins 14–21). The output of the adder 150 on lines 156 is reduced in number in a rounding circuit 158 to comprise the ΣΔI signal on the lines 70. This signal represents the summation (for instance, during range bin number 21) of ΔI determined during range bins 1–8 and during range bins 14–21. As is illustrated in FIG. 2, this is the summation, ΣΔI, which will be interrupted into the $\overline{\Sigma\Delta I}$ utilized to rotate target information for range bin 11. And all preceding range bins will have been rotated with a less complete summation, but because of normalization, one which is adequate.

The output of the circuitry of FIG. 3 on line 70, together with the output of the quadrature window summation circuit 60 (which is not shown in detail and is similar in every respect to that shown in FIG. 3), are applied to the normalizing ROM 74 (FIG. 1) which simply supplies unit vector or normalized values ($\overline{\Delta I}$, $\overline{\Delta Q}$) of the average ΔI and ΔQ by dividing ΣΔI and ΣΔQ each by the square root of the sum of their squares.

In order to produce a running accumulation of the phase angle indicated by the in-phase and quadrature averages provided by the normalizing ROM 74, it is found desirable to return to the angle domain in order to simplify the hardware, principally by avoiding the need for having two complete multibit shift registers (one for $\overline{\Delta I}$ and one for $\overline{\Delta Q}$) having as many stages as the total number of range bins in each PRI (such as 2048, in the example herein); but also to avoid separate I and Q error accumulation which could destroy orthogonality, and thus compound the phase summation error. To convert back to the angle domain, the arc tangent generator 78 may simply be a read only memory operated in a conventional fashion, as is the ROM 34, or it may, in a preferred mode, be implemented with a greatly reduced capacity ROM, as in the embodiment of FIG. 4. The $\overline{\Delta I}$ and $\overline{\Delta Q}$ signals on the lines 66, 68 are following summation over sixteen range bins and normalization, relatively distinct and free of noise. Since they are essentially averages, there is little likelihood of erratic signals, and since they are normalized to a unit vector (no amplitude variation), there is no need to take into account both the sine and the cosine, it being sufficient to convert a single one into the angle domain. The one which is of smaller magnitude is converted because it wil have the greatest sensitivity (that is, the greatest change in sine or cosine as a function of angle); thus the arc sine is taken for angles between 0° and 45° and the arc cosine is taken for angles between 45° and 90°. To resolve quadrant ambiguity, the signs of each of these functions are examined to determine the proper quadrant. This is achieved in the arc tangent generator 78 of FIG. 4 by means of a comparison circuit 160 which determines which of the two functions is smaller and generates a signal on a line 162 indicative thereof so as to provide the seven lower-order bits of the smaller function through a multiplexer 164 over lines 166 to an arc sine/cosine ROM 168. The signal on line 162, acting as a high order address bit, also selects the sine or cosine half of the ROM 168. The sign bits of the functions are stripped off and applied on lines 170, 172 to quadrant logic circuitry 174 which generates two high order bits on lines 176 on the basis of: both plus indicating the first quadrant, for a binary zero, zero; minus cosine and plus sine indicating the second quadrant, for binary zero one, and so forth. In a like fashion, the ROM 168 is provided with a granularity such that the signals on lines 178 will represent 45° at the highest ordered bit, the sum total representing between 0° and 90°, which, together with the signals on the lines 176, represent 360°. This permits simple, binary accumulation modulo two pi.

The combined bits on lines 176, 178 are applied to an adder 180, the output of which comprises the $\Sigma\overline{\Delta\theta}$ signal on lines 82, which is also applied to a shift register 182 having 2048 range bins, so that a running accumulation, range bin by range bin, over the entire PRI, is made of an effective phase difference between each range bin of one PRI and the range bin of the preceding PRI, summed and normalized over sixteen range bins, to provide an average, and accumulated modulo two pi, from each PRI to the next, indefinitely. The principal feature of this invention is that the target data, prior to weighting and filtering, is rotated, by the accumulated average clutter phase for the related PRI only once. Each filter batch includes the corresponding range bin of four (or five) successive PRI's. Each PRI's input to the batch is rotated by $\Sigma\overline{\Delta\theta}$; but since $\Sigma\overline{\Delta\theta}$ is accumulated PRI by PRI, for each range bin, it always represents the clutter phase estimate required to rotate all PRI inputs of the batch back to zero doppler of the first PRI of the batch. And, since only the relative phase of targets with respect to clutter is significant in clutter cancellation, the unknown, random absolute phase at the beginning of each batch resulting from continuous, modulo two pi accumulation, is totally immaterial (and harmless). Because the signals are processed in four-PRI or five-PRI batches, only such error as is generated in four or five PRI's can affect the result; the long term accumulation is simply the random, arbitrary phase angle at the start of each batch, described hereinbefore. Thus, the accumulator 80 is distinct in this invention, and differs from the range bin summations of FIG. 3 herein which are of the type heretofore known in the art. Accumulation modulo two pi is readily achieved by simply ignoring high order bits out of the adder 180, which results in also ignoring the sign of the angle, so that all of the $\Sigma\overline{\Delta\theta}$ angles are between zero and two pi, and are positive. The accumulation modulo two pi of average phase difference, representative of the clutter phase, avoids the necessity of resetting the accumulator for each batch, or on some other basis. This has the additional advantage, in accordance with the invention, of permitting a four PRI batch for clear weather filtering to be processed alternatively with a five PRI batch for accommodating rain clutter, while permitting a constant one-out-of-four-PRI MTI processed video output rate. This is described more fully with respect to FIG. 8, hereinafter.

Figure 5:
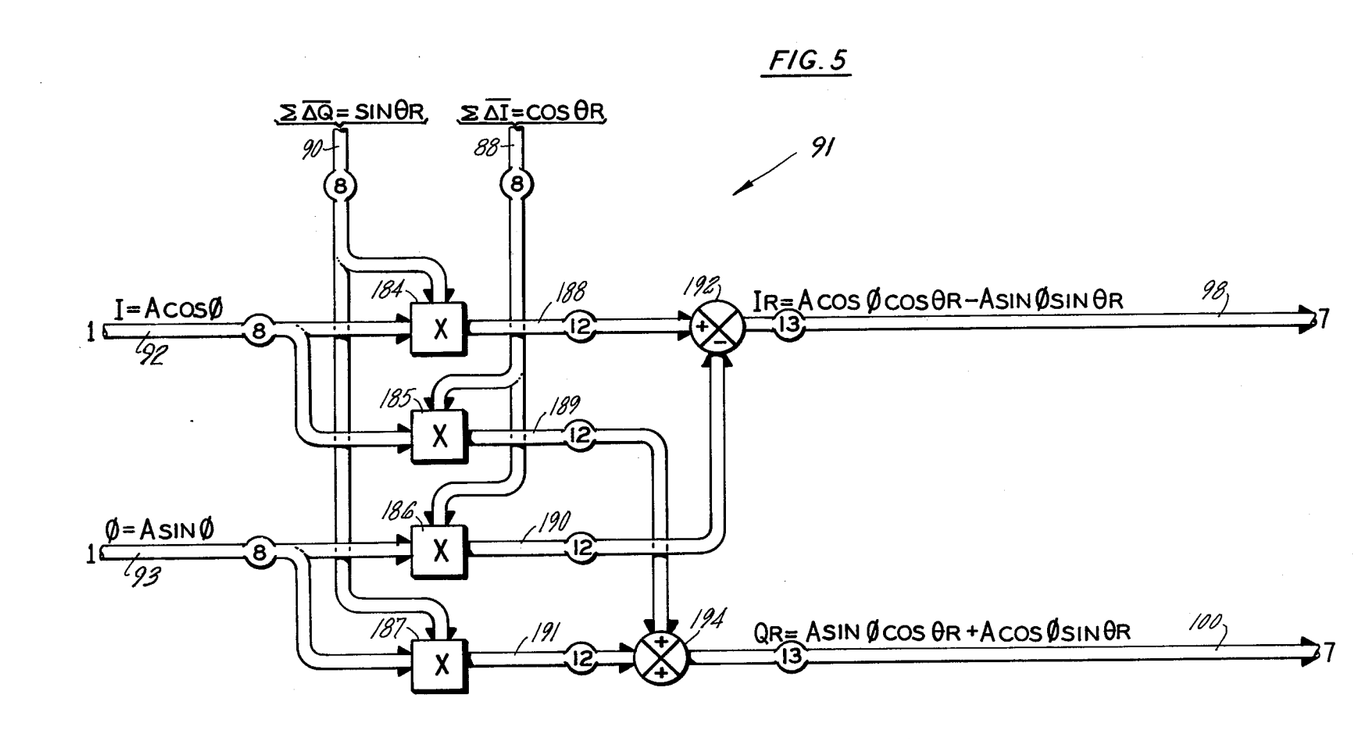
FIG. 5 is a simplified schematic block diagram of a complex multiplier circuit for use in the embodiment of FIG. 1.

Referring again to FIG. 1, the accumulated, average phase differences represented by the $\Sigma\overline{\Delta\theta}$ signals on the lines 82 are reconverted in ROMs 84, 86 to sine and cosine format on the lines 88, 90 and applied to the complex multiplier which is shown in more detail in FIG. 5. Complex multiplication is one known method of rotating the clutter/target video in the I/Q format so as to provide a filterable batch (four or five PRIs) in which each element of the video is rotated by the accumulated average phase of the successive PRI returns, so as to rotate the vectors in the related range bin of each PRI in the batch back to zero estimated doppler in the first PRI of the batch. This processing tends to provide clutter in the successive PRIs which is substantially mutually out of phase in a fashion which permits clutter cancellation, of the type which is known and referred to hereinbefore. One form of complex multiplier, as is illustrated in FIG. 5, consists of four scalar multipliers and two arithmetic units which perform, in effect, the geometric operation of adding (or subtracting) an angle to the angle of a vector. Since the information represented by the $\Sigma\overline{\Delta I}$ and $\Sigma\overline{\Delta Q}$ signals on lines 88, 90 is in the sine/cosine format, it is normalized and represents a unit vector having an angle $\theta_R$, through which the input video is to be rotated. This reduces the dynamic range requirements of the multipliers since the range is only that required to handle the input I and Q amplitudes (A), as is illustrated by the legends in FIG. 5. Thus the signals on the lines 92 and 93 are cross multiplied with the signals on the lines 88, 90 by corresponding scalar multipliers 184–187 to provide product signals on related lines 188–191 for combination in arithmetic units 192, 194 so as to provide the trigonometric identities indicated on the lines 98, 100. The trigonometric identities are known expressions for rectangular components of a vector, of amplitude A and of angle $\phi$, rotated through an angle $\theta_R$.

As is known, adaptive moving target indicator processing typically takes the form of processing a small number of PRIs, such as three, four or five, in a filter or the like, by amplitude weighting the rotated video in a manner such that addition of the amplitude weighted successive PRI components of video will cause a substantial reduction or cancellation of clutter, with commensurate enhancement of moving target signals which are at different doppler frequencies, thereby providing the improvement factor which causes the moving targets to stand out and be far more discernible. One of the features of the present invention is its ability to use either of two different orders (the examples herein being three or four) of clutter filtering while maintaining the same output rate (one output per four PRIs in the example herein). And, in the embodiment herein, the same weighting (including sign) is utilized during the first and last PRI's of the fourth-order filter, and is therefore used in two successive batches of fourth-order filtering, to permit a five-PRI output every fourth PRI. This is illustrated more fully in FIG. 6 wherein illustration (a) identifies an arbitrary sequence of pulse repetition intervals as indicated by the PRF clock signal on the line 18 (although numbered from 1 through 13 in FIG. 6, it is not intended to mean that these should necessarily be the first through thirteenth PRIs, but merely a series of thirteen PRIs in a sequence). Illustration (b) shows the output of a binary counter which is counting the PRIs modulo four, so that it begins all over again after each fourth PRI and provides a binary indication thereof. Illustration (c) shows the weighting which is used in a third-order canceller, to amplitude-weight the rotated signals so that when the amplitude weighted signals are added together over a four-PRI batch, the ideal target signals at a relative frequency between sucessive PRI's corresponding to one half the PRF will be enhanced, whereas signals having a relatively constant phase difference between PRI's (which clutter tends to have) will tend to cancel. Illustration (d) depicts the four-PRI batches used with a third order filter, the batch being complete on the fourth PRI of each batch. Illustration (e) shows the weighting which may be utilized in a fourth-order filter, which weighting is known to provide a greater improvement factor in the case of clutter dominated by rain than does a third-order filter. In accordance with the invention, the availability of two orders of filter in the present embodiment includes a non-symmetrical odd-ordered filter and a higher, even-ordered symmetrical filter the lowest weight of the high order filter being the same (including sign) as the highest weight thereof. Having the high and low orders of the fourth-order filter utilize the same weighting, in combination with batch-accumulated phase estimates ($\Sigma \overline{\Delta\theta}$), permits the use of the weighted data both at the high end of one batch and at the low end of the next succeeding batch.

Figure 6:
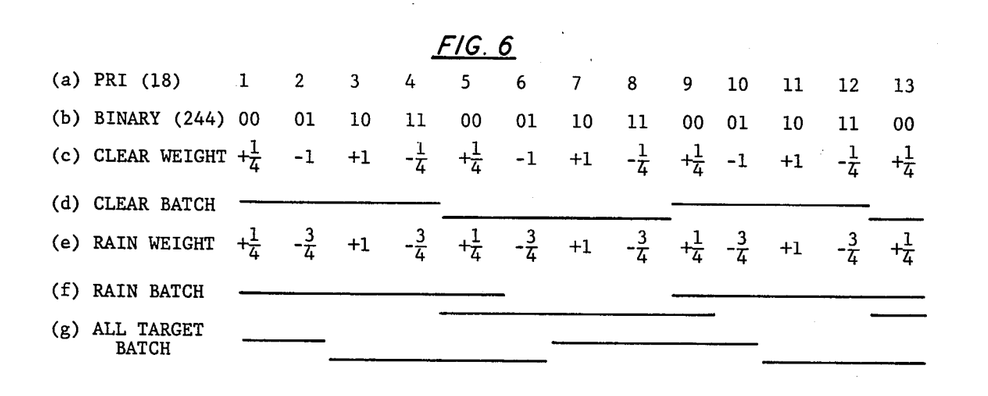
FIG. 6 is a chart illustrating amplitude weighting for two different orders of clutter cancelling adaptive MTI filters.
Figure 7:
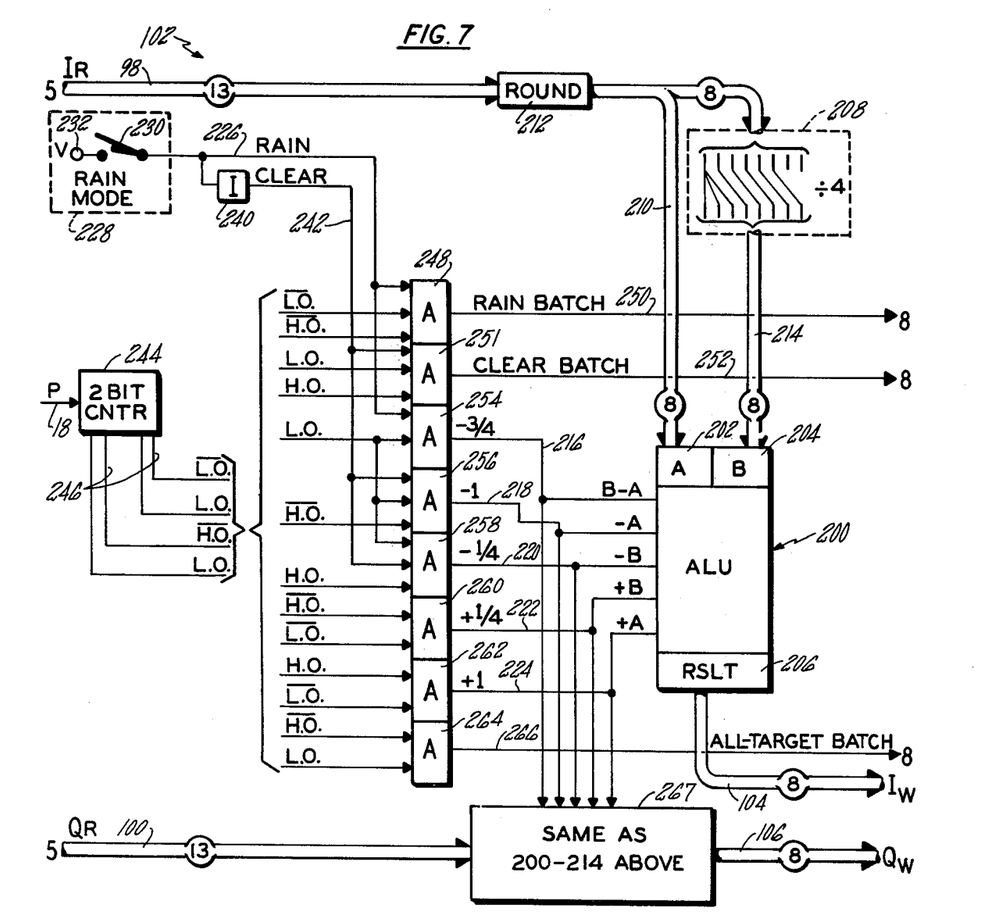
FIG. 7 is a schematic block diagram of amplitude weighting circuitry for use in the embodiment of FIG. 1.

The amplitude weighting may be provided by simply multiplying, in a scalar fashion, the incoming data with the weightings illustrated in FIG. 6 for the different orders of the two filters. Referring now to FIG. 7, the present embodiment, however, does not provide straight multiplication but simply manipulates the data to achieve the equivalent result. This is accomplished in accordance herewith by means of an arithmetic logic unit 200, of the type which is readily available in the market, such as a Texas Instruments 54LS181 or a Fairchild 9341, which includes an A input register 202, a B input register 204, and an output or result register 206. Included among the various functions which such a unit can perform are the ability to pass either register 202, 204 with or without sign inversion to the result register 206, or to subtract one from the other. These features are utilized along with a divide-by-four function, illustrated by a shifter 208, which may simply comprise shifting the input data to the right, dropping the low order bit, and filling the high order bits in with the sign bit of the original data. In order to reduce the capability of the ALU 200 which is required to perform this function, the incoming data may be rounded from 13 bits, as it appears on lines 98, to 8 bits on lines 210 by a rounding circuit 212 which may be of the same type as the rounding circuit 142 in FIG. 3. Thus, the full incoming data is available at the A input 202 and the data divided by four is available over lines 214 to the B input 204.

As illustrated in the middle of FIG. 7, detecting a desired amplitude weighting of $-\frac{3}{4}$ on a signal line 216 will energize a line or combination of lines in the ALU 200 to subtract A from B, thus causing $-\frac{3}{4}$ of the data on the lines 210 to appear in the result register 206. Similarly, detecting a desired amplitude weighting of $-1$ will provide a signal on a line 218 that causes the negative of the signal on lines 210 to appear in the result register 206; detecting a desired amplitude weighting of $-\frac{1}{4}$ will provide a signal on line 220 that will cause the negative of the B input to be provided in the result register 206, which equals the negative of $\frac{1}{4}$ of the data on the lines 210; detecting a desired amplitude weighting of $+\frac{1}{4}$ will provide a signal on a line 222 to cause the B input to be applied directly to the result register 206, thereby providing $\frac{1}{4}$ of the value of the data on the lines 210 therein; and detecting a desired amplitude weighting of $+1$ will provide a signal on a line 224 that causes the A input 202 to be directly applied to the result register 206, resulting in the data on lines 210 appearing therein.

In FIG. 7, the desired amplitude weighting is decoded in a straightforward fashion in accordance with the table of FIG. 6 by combining the rain/clear filtering which is desired with the indicated PRI. To achieve this, a signal on a line 226 indicates when the rain mode is desired, thereby to utilize the fourth-order filter shown in illustrations (e) and (f) of FIG. 6. This may be achieved by means of a rain mode selector 228 which, in its simplest form, may simply comprise a switch 230 connected to a suitable source of voltage 232, the switch being operable by the radar operator when desired. On the other hand, the rain signal on the line 226 may be provided in any other suitable fashion, such as under program control of an overriding system command computer, or the like. In the absence of the signal on the line 226, an inverter 240 will provide a clear signal on a line 242. In order to keep track of the successive PRIs, a two bit counter 244 which rolls continuously between maximum count and zero on a cyclic basis provides the binary signals shown in illustration (b) of FIG. 6 which keep track of the order of PRI signals (1-4, respectively). This provides output signals on a plurality of lines 246 indicative of low order (L.O.), not low order ($\overline{L.O.}$), high order (H.O.) and not high order ($\overline{H.O.}$) bits, for decoding along with the rain and no rain signals to provide the desired weighting and batch controls. Specifically, an AND circuit 248 decodes rain and zero-zero to provide the rain batch signal on a line 250; an AND circuit 251 decodes rain and one-one to provide the no rain batch signal on a line 252; an AND circuit 254 decodes rain and the presence of a low order bit, thereby indicative of zero-one or one-one, to provide the $-\frac{3}{4}$ weighting signal on the line 216; an AND circuit 256 decodes clear and zero-one to provide the $-1$ weighting signal on the line 218; an AND circuit 258 decodes clear and one-one to provide the $-\frac{1}{4}$ weighting signal on the line 220; an AND circuit 260 decodes zero-zero, without regard to rain or clear, to provide the $+\frac{1}{4}$ signal on the line 222, which accommodates the low order of the third-order filter (illustration (c), FIG. 6) and the high and low orders of the fourth-order filter (illustration (e), FIG. 6); an AND circuit 262 decodes one-zero without regard to rain or clear to provide the $+1$ amplitude signal on the line 224; and, as is described more fully with respect to FIG. 8 hereinafter, an AND circuit 264 decodes zero-one to provide an all-target batch signal on a line 266. The Q component of the rotated input signal on the lines 100 is processed, in the same fashion as the I component, in circuitry 267 which duplicates the circuitry 200-214, so as to provide, between them, weighted I and Q components ($I_W$, $Q_W$) on the lines 104 and 106.

Figure 8:
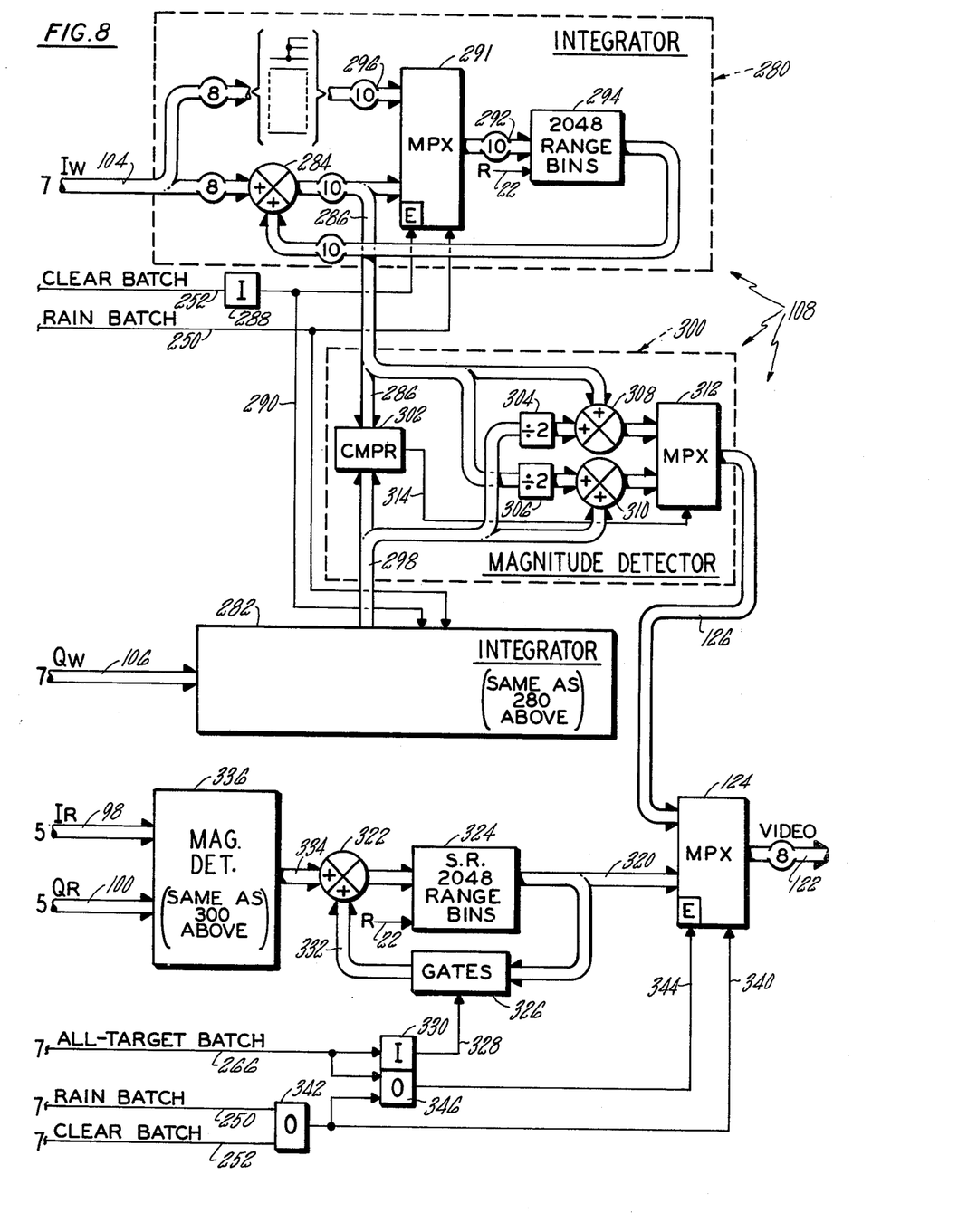
FIG. 8 is a simplified schematic block diagram of clutter cancelling, integration and magnitude detection circuitry for use in the embodiment of FIG. 1.

Referring now to FIG. 8, the weighted signals in each batch (either four or five PRIs per batch) are summed or integrated in integrators 280, 282 which are within the clutter cancelling and integration circuits 108 (FIG. 1). Since an ideal target has a phase reversal of 180° in each successive PRI, and since any nonideal target having a lesser phase reversal has a commensurate lesser gain through the clutter filtering process, the maximum amplitude of the weighted, rotated signals which may be accumulated over the four-PRI or five-PRI batches is three times the input signal. In the integrator 208 at the top of FIG. 8, this is accommodated by providing for as many as ten bits of output with a maximum input of weight bits, such that adding four or five of the amplitude weighted signals together will not exceed the dynamic range of the integrator.

Specifically, consider first a clear weather batch, that is, a four-PRI batch of data using the third-order cancellation referred to in illustrations (c) and (d) of FIG. 6. The incoming weighted phase components $I_W$ are applied on the lines 104 to an adder 284, the output of which on lines 286 comprises the four-batch summation, during the first three PRIs, the clear batch signal is not present on the line 252, so an inverter 288 will provide a signal on a line 291 to enable a multiplexer 292 which is connected to the output of the adder on the lines 286; this provides the adder output on lines 292 to a shift register 294 having as many stages as there are range bins in each PRI (such as 2048) so that each range bin of each PRI is brought back in the next PRI to be added in at the adder 284. However, during the fourth PRI of the clear batch, the clear batch signal appears on the line 252, causing the inverter 288 to no longer provide the signal on line 291, so that the multiplexer 290 is no longer operative, and the signals are blocked from the shift register 294, causing it to fill with zeros. In this fashion, each batch starts with a zero accumulation and builds up to the four-PRI accumulation on a range-bin-by-range-bin basis, providing the summations on the lines 286.

In the case of operation in the rain mode, the clear batch signal on the line 252 is never present, so that the inverter 288 always provides the enable signal on the line 291, and the multiplexer 291 will be able to pass something to the lines 292 during every PRI. In fact, the multiplexer 291 will provide signals on the lines 286 to the lines 292 except when the rain batch signal is present on the line 250, at which time the multiplexer 291 will instead pass signals from lines 296 to the lines 292, the signals on the lines 296 comprising an expansion of the signals on the lines 104 by simply repeating the high order bit. This means that during each of the fifth, ninth and thirteenth and so forth PRIs, the total will be made by the adder 284 including a one quarter weighting of the data, and that one quarter weighting of the data will also be applied to the shift register 294, on a range-bin-by-range-bin basis, so as to form the beginning of the next summation of five PRIs as is set forth in illustrations (e) and (f) of FIG. 6. The integrator 282 performs in the same fashion with respect to the weighted quadrature signals ($Q_W$) on the lines 106.

The outputs of both integrators on lines 286, 298 are applied to a magnitude detector 300 to provide an approximation of the magnitude of the vector represented by the in-phase and quadrature, batch-filtered results on the lines 286 and 298, by the algorithm: the larger plus one half of the smaller, as determined by a compare circuit 302. In the magnitude detector 300, there may be provided dividers 304, 306 which are simply shifters, of the form illustrated by the shifter 208 in FIG. 7, for summing in respective adders 308, 310, the outputs of which provides the magnitude of one plus half the other, both results being applied to a multiplexer 312, the correct one of which is selected by the output on a line 314 from the comparator 302. Alternatively, one adder may be used with multiplexed inputs thereto controlled by the compare circuit 302. The output of the multiplexer 312 on lines 126 comprises the moving target video, which is present every fourth PRI, and which is provided as the video output on lines 122 by the multiplexer 124 every fourth PRI.

The multiplexer 124 also responds to signals representing all-target video (including non-moving targets) on lines 320, which comprise four-PRI integrations effected by an adder 322 and a shift register 324. The shift register 324 is limited so as to accumulate all-target video in four-PRI batches by gates 326, which are blocked every fourth PRI as the batch is read out on the lines 320. The gates 326 are blocked by the absence of a signal on a line 328 from an inverter 330 whenever the all-target batch signal appears on the line 266. The gates supply one input to the adder 322 on lines 332, the other input to the adder being on lines 334 from a magnitude detector 336 which is the same as the magnitude detector 300 described hereinbefore. Detection before integration is provided in the all-target case (for non-moving targets) so as to sense any targets which appear above the clutter, whether or not they are moving, and whether or not they are moving at an invisible rate due to a staggered PRF, or other idiosyncrasies of the adaptive MTI processing described hereinbefore. The multiplexer 124 is switched to provide the moving target video on the lines 126 to the video output on lines 122, during MTI batches, by a signal on a line 340 from an OR circuit 32 that recognizes rain batches and clear batches; alternatively, the multiplexer could be arranged to swtich the all-target batches in response to the signal on the line 266 (with no difference in the operation). To prevent any output except during the periods when one or the other of the batches has been properly accumulated and detected, a signal on a line 344 is provided to enable the multiplexer (thereby connecting one or the other of its input sets with its output) in response to an OR circuit 346 recognizing any one of the three possible batches.

The invention, as described with respect to the foregoing embodiment, takes advantage of the simple arithmetic relationship of phase angle in the angle domain to permit arithmetic determination of $\Delta\theta$, and to permit arithmetic accumulation of $\Sigma\overline{\Delta\theta}$. But on the other hand, gross errors which result from accumulating angles in the angle domain are overcome by providing the range bin accumulation in the vector domain, and by providing the $\Sigma\overline{\Delta\theta}$ accumulation utilizing only normalized data representing angles between zero and two pi, on a modulo two pi basis. Utilizing normalized I and Q vector processing for providing the summations of phase difference across the range bin windows eliminates errors as a consequence of variations in magnitudes (particularly the corrupting of estimated phase angle by large targets and the like), and eliminates the gross errors from summations made in the angle domain. Accumulation of phase estimate ($\Sigma\overline{\Delta\theta}$), each PRI after the next, essentially on an endless basis, provides a phase estimate (presented herein as $\Sigma\overline{\Delta I}$ and $\Sigma\overline{\Delta Q}$) which, when used to rotate the input video vectors but a single time, nonetheless rotate the vectors back to the estimated zero clutter angle for a batch being processed. Since this is achieved on a continuing basis, it permits utilizing one element of the weighted data in a four-PRI group as the last element of a five-PRI filter batch and as the first element of a succeeding five-PRI filter batch, thus accommodating varied-ordered filters in clutter elimination, while maintaining a constant weighting cycle and a constant output rate. And, utilization of the continuously-accumulated phase estimate in the single rotation of the input video vectors eliminates multiple accumulation of rotated vectors in which the I and Q components become non-orthogonal and create accumulated angular errors, that can significantly reduce adaptive MTI performance improvement unless some form of normalization or other error elimination is provided. If desired, when overlapped batch processing is not used, the accumulated phase difference ($\Sigma\overline{\Delta\theta}$) may be maintained only over each batch (being reset for each batch) with the same advantage of single rotation of each vector.

In many instances herein, the exemplary circuitry illustrates that rounding of data may be utilized in order to reduce the processing power required by the various components. This need not be utilized if not necessary in any embodiment; similarly, other aspects of the implementation may be altered as desired in any given implementation of the invention. And, although the invention has been shown and described with respect to an exemplary embodiment thereof, it should be understood by those skilled in the art that the foregoing and various other changes, omissions and additions may be made therein and thereto, without departing from the spirit and the scope of the invention.

Having thus described a typical embodiment of our invention, that which we claim as new and desire to secure by Letters Patent is:

1. Adaptive moving target indicator radar signal processing apparatus for use with coherent or non-coherent radar of the type which provides return signals indicative of reflections received in each of a plurality of successive range bins as a consequence of repetitive illumination of a target area in each of a sequence of pulse repetition intervals (PRIs), comprising:

difference means responsive to said return signals for comparing the phase of signals in each range bin during each PRI with the phase of signals in a corresponding range bin of a succeeding PRI and for providing in response thereto phase signals representing estimated phase difference of clutter in succeeding PRIs of each range bin;

accumulation means responsive to said phase signals for providing summation signals indicative of the summation, modulo two pi, of the phase differences represented by said phase signals in corresponding range bins of said sequence of PRIs, said summation signals representing the estimated accumulated phase of clutter in the given range bin over said sequence of PRIs;

rotation means responsive to said return signals and to said summation signals to provide, in each range bin, rotated vector signals indicative of a vector of amplitude and angle represented by said return signals in said range bin rotated through the angle represented by said summation signals for said range bin; and clutter elimination means responsive to said rotation means for combining said rotated vector signals related to a like range bin in several PRIs to provide moving target signals indicative of the presence of moving targets having average doppler frequency significantly different from the estimated clutter doppler frequency related to said phase signals.

2. Apparatus according to claim 1 wherein said clutter elimination means comprises:

weighting means for providing a specific, corresponding amplitude weighting to said rotated vector signals in each PRI of a group of several, successive PRIs, the magnitude and sign of the amplitude weighting in each PRI of each group being the same as the magnitude and sign of the amplitude weighting in a corresponding PRI of the next group; and means for summing said weighted vector signals in batches consisting of one more PRI than said groups, the last weighted vector signal of one batch comprising the first weighted vector signal of the next batch, said weighting means providing several weighted vector signals in each group of relative magnitude and sign such that summation of the weighted signals in each batch tends to cancel signals of phase corresponding to the related ones of said summation signals and tends to enhance signals of phase significantly different therefrom.

3. Apparatus according to claim 1 wherein said difference means is responsive to said return signals for providing difference signals indicative of the phase difference between return signals in each range bin of each PRI and return signals of a corresponding range bin of a succeeding PRI, and includes means for providing for each particular range bin of each PRI one of said signals in response to a plurality of said difference signals generated in the same PRI for related range bins which are close in range to said particular range bin.

4. Apparatus according to claim 3 wherein said difference means includes means for providing said phase signals as the normalized summation of the difference signals corresponding to said related range bins.

5. Adaptive moving target indicator radar signal processing apparatus for use with coherent or non-coherent radar of the type which provides I and Q signals indicative of the cosine and sine components, respectively, of the reflection vectors received in each of a plurality of successive range bins as a consequence of repetitive illumination of a target area in each of a sequence of pulse repetition intervals (PRIs), comprising:

arctangent means responsive to said I and Q signals for generating, for each range bin, angle signals indicative of the angle of the vector represented by said I and Q signals;

difference means responsive to the angle signals of each range bin within one PRI and the angle signals of a corresponding range bin of the succeeding PRI to provide a difference signal indicative of the angular difference represented by said angle signals;

vector means responsive to said difference signals for generating, for each range bin of each PRI, $\Delta I$ and $\Delta Q$ signals indicative of the cosine and sine components, respectively, of a unit vector having an angle represented by the corresponding one of said difference signals;

summation means responsive to said $\Delta I$ and $\Delta Q$ signals for providing for each given range bin of each PRI, $\Sigma \Delta I$ and $\Sigma \Delta Q$ signals as the respective summations of the $\Delta I$ and $\Delta Q$ signals of particular range bins close in range to and within the same PRI as said given range bin; and normalizing means responsive to said $\Sigma \Delta I$ and $\Sigma \Delta Q$ signals for providing for each range bin of each PRI, corresponding $\overline{\Delta I}$ and $\overline{\Delta Q}$ signals as the ratio of each of said $\Sigma \Delta I$ and $\Sigma \Delta Q$ signals, respectively, to the square root of the sum of their squares.

6. Apparatus according to claim 5 wherein said summation means includes means for providing said $\Sigma \Delta I$ and $\Sigma \Delta Q$ signals as the respective summations of the $\Delta I$ and $\Delta Q$ signals of particular range bins which include range bins lower in range than and separated by at least one range bin from said given range bin, and which include range bins higher in range than and separated by at least one range bin from said given range bin.

7. Apparatus according to claim 5, further comprising:

additional arctangent means responsive to said $\overline{\Delta I}$ and $\overline{\Delta Q}$ signals to provide, for each range bin, $\overline{\Delta \theta}$ signals indicative of the angle of the vector represented by said $\overline{\Delta I}$ and $\overline{\Delta Q}$ signals; and accumulation means responsive to said $\overline{\Delta \theta}$ signals for providing $\Sigma \overline{\Delta \theta}$ signals indicative of the summation, modulo two pi, of said $\overline{\Delta \theta}$ signals.

8. Apparatus according to claim 7, further comprising:

additional vector means responsive to said $\Sigma\overline{\Delta\theta}$ signals for generating, for each range bin of each PRI, $\Sigma\overline{\Delta I}$ and $\Sigma\overline{\Delta Q}$ signals indicative of the cosine and sine components, respectively, of a unit vector having an angle represented by the corresponding one of said $\Sigma\overline{\Delta\theta}$ signals; and means responsive to said I and Q signals and to said $\Sigma\overline{\Delta I}$ and $\Sigma\overline{\Delta Q}$ signals for providing signals indicative of targets moving at velocities different from the average estimated clutter velocity represented by said $\Sigma\overline{\Delta I}$ and $\Sigma\overline{\Delta Q}$ signals.

* * * * *

UNITED STATES PATENT AND TRADEMARK OFFICE
CERTIFICATE OF CORRECTION

PATENT NO. : 4,137,533
DATED : January 30, 1979
INVENTOR(S) : George T. Briechle, John A. Di Domizio and Frederick Weindling It is certified that error appears in the above-identified patent and that said Letters Patent are hereby corrected as shown below:

| | |
|---|---|
| Column 2, line 4 | "adpative" should read --adaptive-- |
| Column 2, line 52 | "unde" should read --undue-- |
| Column 8, line 9 | "interrupted" should read --inputted-- |
| Column 8, line 47 | "wil" should read --will-- |
| Column 11, line 17 | "in" should read --on-- |
| Column 12, line 55 | "weight" should read --eight-- |
| Column 14, line 10 | "32" should read --342-- |
| Column 14, line 12 | "swtich" should read --switch-- |
| Column 16, line 7 | "said signals" should read --said phase signals-- |

Signed and Sealed this

Fifth Day of June 1979

[SEAL]

Attest:

RUTH C. MASON
Attesting Officer

DONALD W. BANNER
Commissioner of Patents and Trademarks